United States Patent [19]

Nishikawa et al.

[11] Patent Number: 5,374,480
[45] Date of Patent: Dec. 20, 1994

[54] MAGNETIC RECORDING MEDIUM

[75] Inventors: Yasuo Nishikawa; Toshio Ishida, both of Kanagawa, Japan

[73] Assignee: Fuji Photo Film Co., Ltd., Kanagawa, Japan

[21] Appl. No.: 89,641

[22] Filed: Jul. 12, 1993

Related U.S. Application Data

[63] Continuation of Ser. No. 729,763, Jul. 15, 1991, abandoned.

[30] Foreign Application Priority Data

Jul. 16, 1990 [JP] Japan ................................. 2-185389

[51] Int. Cl.$^5$ ................................................ G11B 5/00
[52] U.S. Cl. .................................. 428/336; 428/341; 428/421; 428/694 TF; 428/900
[58] Field of Search ............... 428/336, 341, 421, 422, 428/694, 695, 900, 694 TF

[56] References Cited

U.S. PATENT DOCUMENTS

| | | | |
|---|---|---|---|
| 4,696,845 | 9/1987 | Yanagisawa | 428/64 |
| 4,770,924 | 9/1988 | Takai et al. | 428/212 |
| 4,855,175 | 8/1989 | Wakai et al. | 428/148 |
| 5,128,216 | 7/1992 | Ng | 428/695 |

FOREIGN PATENT DOCUMENTS 0287974 10/1988 European Pat. Off. .

*Primary Examiner*—Stevan A. Resan
*Attorney, Agent, or Firm*—Sughrue, Mion, Zinn, Macpeak & Seas

[57] ABSTRACT

A magnetic recording medium having stable running properties and durability even under the severe environmental conditions of low or high humidity is disclosed. The magnetic recording medium comprises a non-magnetic support and a magnetic layer of a thin ferromagnetic metal film formed thereon, wherein the thin ferromagnetic metal film has thereon at least one member selected from fluorine-containing multi-chain type compounds represented by the following general formula (I):

$$(P)_m Q(R)_n \quad (I)$$

wherein Q represents (m+n) valent organic residue; R represents a monovalent group comprising a fluoropolyether chain; P represents a monovalent oxo-acid derivative group or a monovalent group which is a salt of an oxo-acid derivative; m represents an integer of 1 or more; and n represents an integer of 2 or more.

7 Claims, No Drawings

MAGNETIC RECORDING MEDIUM

This is a continuation of application No. 07/729,763 filed Jul. 15, 1991, now abandoned.

FIELD OF THE INVENTION

The present invention relates to a magnetic recording medium which is provided with a thin ferromagnetic metal film as a magnetic recording layer, and particularly to a thin metal film type magnetic recording medium which is excellent in running properties and durability over a wide range of temperature and humidity.

BACKGROUND OF THE INVENTION

Previously, coating type magnetic recording media have been prepared by coating non-magnetic supports with a coating comprising organic polymer binders and magnetic materials of ferromagnetic powders dispersed therein. In recent years, with the increased demand for high density recording, magnetic recording media of the so-called thin metal film type which are free of binders and which have thin ferromagnetic metal films formed by paper deposition methods (such as vacuum deposition, sputtering and ion plating), or plating methods (such as electroplating and electroless plating) as magnetic layers, have attracted attention and partly utilized.

In particular, the vacuum deposition method does net require waste fluid treatment which is necessary in the plating method. Further, the manufacturing processes involved in vacuum deposition are simple, and the deposition rate of films is high. This method therefore has merit. Methods for producing magnetic films, having a coercive force and a squareness which are desirable for magnetic recording media, by the vacuum deposition and oblique incidence vapor deposition methods are described in U.S. Pat. Nos. 3,342,632 and 3,342,633.

Major problems concerning magnetic recording media having thin ferromagnetic metal films include weather resistance, running properties and durability.

Magnetic recording media move at a high speed compared to the magnetic head during recording, reproducing and erasing of magnetic signals. Running the media must be carried out smoothly and stably, and at the same time, abrasion or breakage due to contact with the head must not occur. In view of these problems, there is a need for lubricating layers or protective layers on the thin ferromagnetic metal films as means for improving their running properties and durability.

The protective layers of the magnetic recording media of the thin metal film type include layers formed by applying thermoplastic resins, thermosetting resins, fatty acids, metal salts of fatty acids, fatty acid esters or alkyl phosphates dissolved in organic solvents. For example, such protective layers are disclosed in JP-A-60-69824 (the term "JP-A" as used herein means an "unexamined published Japanese patent application") and JP-A-60-85427.

Recently, a technique of improving the durability of the media by using compounds having branched perfluoroalkenyl groups has been developed (JP-A-61-107528).

Investigations of the application of perfluoroalkyl polyether compounds have also been extensively conducted, and U.S. Pat. No. 3,778,308 proposes providing a perfluoropolyether on a thin ferromagnetic metal film. Further, JP-B-60-10368 (the term "JP-B" as used herein means an "examined Japanese patent publication") describes a perfluoropolyether of the terminal modification type in which one or both termini of the perfluoropolyether chain are modified with polar groups such as carboxyl groups.

Furthermore, there is the report that a multi-chain type perfluoropolyetheramide obtained by dehydration condensation of a compound having a plurality of amine groups and a perfluoropolyether chain having a carboxyl group at one terminus thereof was tested as a lubricating agent for disk-like magnetic recording media of the thin metal film type (Sugiyama et al., the 34th National Meeting, the Lubrication Society of Japan, B-28; Preliminary Reports issued on October, 1989, p. 425). This compound results in fairly good running properties and durability, but has the undesirable effect of reducing the coefficient of static friction. Improvements have been therefore desired.

As described above, the magnetic recording media of the thin metal film type shown in the prior art have the problems that the running properties and durability are insufficient under severe conditions of high or low humidity, and that the electromagnetic characteristics deteriorate due to spacing loss between the head and the recording medium caused by the thickness of the protective or lubricating layer. These problems have limited the practical applications of the magnetic recording media of the thin metal film type.

SUMMARY OF THE INVENTION

The present invention addresses the above-described problems of the prior art. In particular, it is one object of the present invention to provide a magnetic recording medium of the thin metal film type which is excellent in running properties, durability and electromagnetic characteristics over a wide range of environmental conditions.

The present invention provides a magnetic recording medium comprising a non-magnetic support and a magnetic layer of a thin ferromagnetic metal film formed thereon, wherein said thin ferromagnetic metal film has thereon at least one fluorine-containing multi-chain compound represented by the following general formula (I):

$$(P)_m Q (R)_n \qquad (I)$$

herein Q represents a (m+n) valent organic group; R represents a monovalent group comprising a fluoropolyether chain; P represents a monovalent oxo-acid derivative group or a monovalent group which is a salt of an oxo-acid derivative; m represents an integer of 1 or more; and n represents an integer of 2 or more.

DETAILED DESCRIPTION OF THE INVENTION

The present invention is characterized in that a fluorine-containing multi-chain type compound represented by the above-described general formula (I) (this compound is hereinafter referred to as the compound of the present invention) is present on a thin ferromagnetic metal film as a lubricating agent.

The compound of the present invention is the fluorine-containing multi-chain type compound which includes (1) a monovalent oxo-acid derivative group having anchor effect strong in binding strength to thin ferromagnetic metal films or a monovalent group which is the salt of the oxo-acid derivative (this group is hereinafter referred to as the P group), and (2) at least two monovalent groups which each principally comprise fluoropolyether chains (these groups are hereinafter referred to as R groups). These groups are bound to a trivalent or higher valent organic residue (hereinafter referred to as a Q residue)

The compound of the present invention has at least one P group which acts as an anchor and at least two R groups, so that the surface of the thin ferromagnetic metal film layer can be covered with the compound of the present invention more densely than with conventional compounds.

Moreover, the P group, the anchor, firmly fixes the compound of the present invention to the surface of the thin ferromagnetic metal film to maintain a state in which the R groups are densely arranged parallel to one another on the surface of the thin ferromagnetic metal film.

For this reason, the compounds of the present invention are not easily removed from the surface of the thin ferromagnetic metal film even if environmental conditions such as temperature and humidity vary, or external forces are applied thereto by contact with the head or mechanical parts. Moreover, the covering rate of the R groups on the surface of the thin ferromagnetic metal film is high. Running durability is therefore increased. The effect of the present invention is remarkably shown in its coefficient of static friction and good still durability results.

The P groups contained in the compounds of the present invention are derived from oxo-acids. Here, the term "oxo-acid" means a compound in which all atoms binding to a central atom are oxygen atoms and hydrogen atoms bind to some or all of the oxygen atoms to form hydroxyl groups, whose hydrogen atoms produce hydrogen ions in an aqueous solution, thereby exhibiting acid properties. In the present invention, the oxo-acids further includes an acid in which carbon atoms or the like bind to a central atom. Further, they may also be in the form of salts thereof.

Accordingly, specific examples of the P groups include a sulfonic acid group, a sulfinic acid group, a carboxyl group, phosphoric acid, phosphonic acid and groups which are salts thereof.

Typical examples of the P groups contained in the compound of the present invention include:

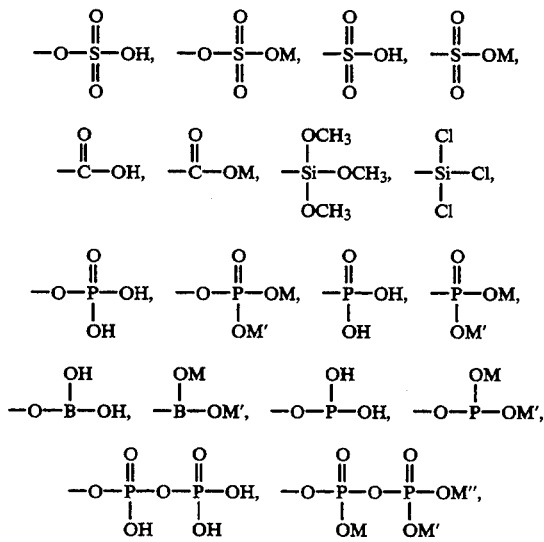

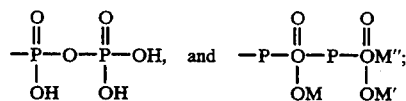

wherein M, M' and M'' may be the same or different and each represents a metal or ammonium.

Specific examples of the metal represented by M, M' and M'' include Li, Na, K, Be$_\frac{1}{2}$, Mg$_\frac{1}{2}$, Ca$_\frac{1}{2}$, Sr$_\frac{1}{2}$, Ba$_\frac{1}{2}$, Fe$_\frac{1}{2}$, Fe$_\frac{1}{3}$, Co$_\frac{1}{2}$, Co$_\frac{1}{3}$, Ni$_\frac{1}{2}$, Cu$_\frac{1}{2}$ and Al$_\frac{1}{3}$.

Specific examples of the ammonium represented by M, M' and M'' include NH$_4$, NH(CH$_3$)$_3$, NH(C$_2$H$_5$)$_3$, NH(C$_3$H$_6$)$_3$, N(CH$_3$)$_4$, N(C$_2$H$_5$)$_4$ and N(CH$_3$)$_3$C$_{18}$H$_{37}$.

Further, when M and M' or M, M' and M'' exist on the P group, they may be hydrogen atoms, provided that they don't represent hydrogen atoms at the same time.

The number of the P groups contained in the compound of the present invention, namely m, is preferably 1 to 3, and more preferably 1 and 2.

The R group contained in the compound of the present invention is mainly composed of the fluoropolyether chain. Namely, the R group is a chain organic group having at least a fluoropolyether site (a divalent group), a binding site to the Q residue, and a terminal portion (an end group). The R group may take any binding form as long as it has at least the fluoropolyether site.

Said fluoropolyether can be selected from the group consisting of perfluoropropylene oxide polymer (stratigh or branched), perfluorooxypropylene-perfluorooxymethylene copolymer, perfluorooxyethylene-perfluorooxymethylene copolymer, tetrafluoropropyleneoxide-pentafluoropropyleneoxide-pentafluoropropyleneoxide copolymer and many other fluorine-containing polyethers. Further, chlorine or bromine can be introduced to the fluoropolyether.

Preferred examples of the fluoropolyether sites include [OCF$_2$CF(CF$_3$)]$_k$ (wherein k is an integer from 3 to 40), (OCF$_2$CF$_2$CF$_2$)$_l$ (wherein l is an integer from 3 to 50) and (OCF$_2$)$_p$(OCF$_2$CF$_2$)$_q$ (wherein q is nearly equal to p and p is an integer from 2 to 20).

End groups of R can be selected from the group consisting of F, CF$_3$, C$_2$F$_5$, Cl, H or any kind of groups. However, polar group such as carboxyl group, methyl ester, amide, alcanol amide, hydroxyl group are not preferable as end group of R.

Length of R is not limited. Preferable length of R is from 500 to 8,000 in terms of molecular weight. For example, the number of repeating unit of perfluoropropylene oxide is preferably from 3 to 47.

The binding sites of the above-described R groups to the Q group (namely, from the viewpoint of the Q group, the sites are binding sites of the Q group to the R groups, and the number of the binding sites corresponds to the valence n) include divalent organic binding groups (for example, divalent groups derived from ester, amido, urethane, urea, ether, thioether, thioester ketone and carbonate groups. Inparticular, amido binding groups are preferably used.

There is no limitation for the direction of these organic binding groups. As to the ester and amido groups, however, it is preferred that the binding is carried out in such a direction that the carbonyl group exists on the R's fluoropolyether site side.

The number of the R groups contained in the present invention, namely the value of n, is 2 to 30, and preferably 3 to 12. If n is too small, the thin ferromagnetic metal film is insufficiently coated with the fluoropolyether chains, and a reduction in the coefficient of friction can not be expected. On the other hand, if n is too large, the solubility of the compound of the present invention to solvents decreases and uniform coating becomes difficult, which results in a decrease in lubricity.

The Q group contained in the compound of the present invention is an intermediating organic group for compensating the functions of both the P group and the R group which bind to each other. In other words, the Q group has the function of connecting with both the P group and the R group. The structure thereof is not particularly limited. If the P group is directly bound to the R group, since the R group is a fluorine containing group which is highly electron attractive, the chemical stability of the compound becomes low. Therefore, in the present invention, the Q group intervenes between the P group and the R group to increase the stability of the compound.

Examples of the above-described Q groups include (m+n) valent groups derived from aromatic hydrocarbons, aliphatic hydrocarbons and alicyclic hydrocarbons, and particularly groups having aromatic rings are desirable. Examples of such aromatic rings include a benzene ring and a naphthalene ring. Specific examples of the Q groups include:

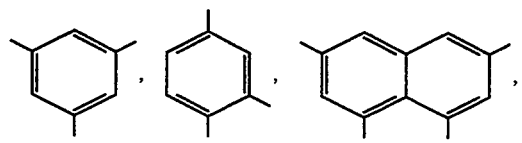

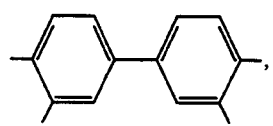

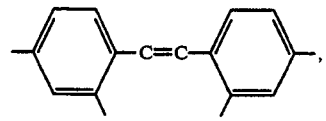

$-CH_2-CH-CH_2-S-S-CH_2-CH-CH_2-$,

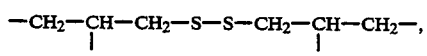

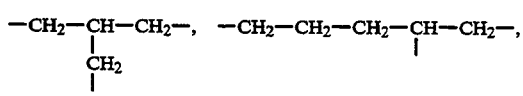

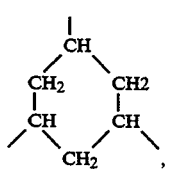 and 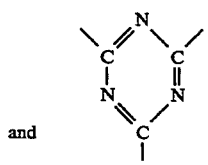.

Examples of the compounds of the present invention are shown below, but the compounds of the present invention are not limited thereto:

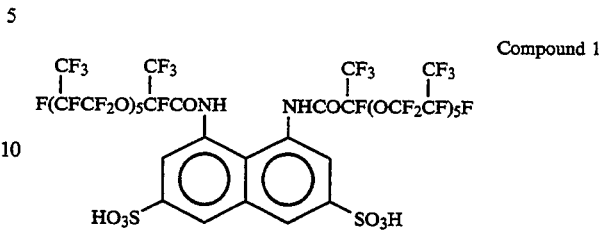

Compound 1

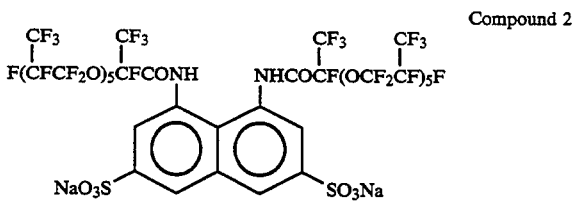

Compound 2

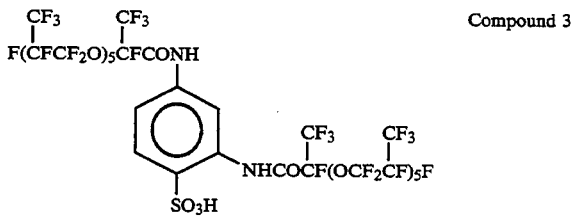

Compound 3

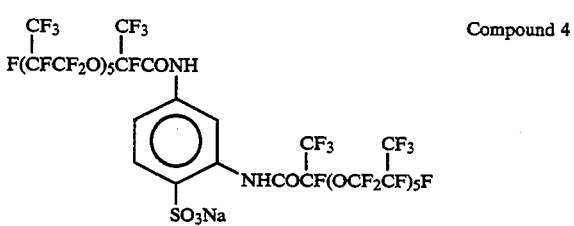

Compound 4

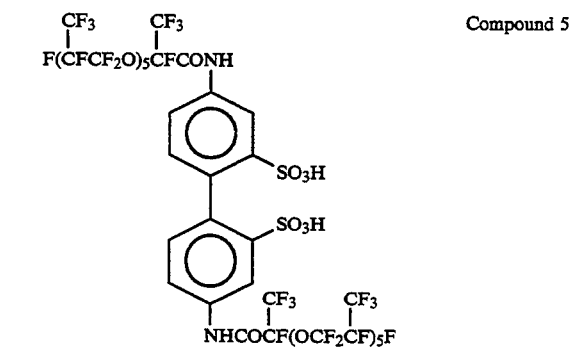

Compound 5

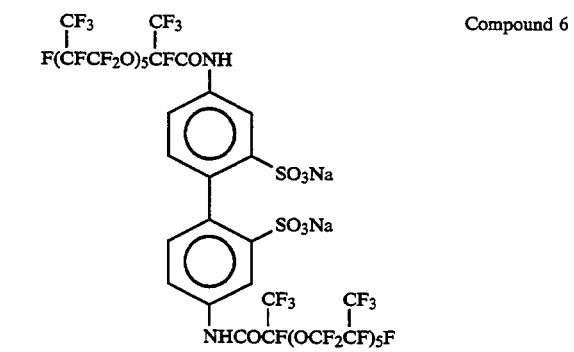

Compound 6

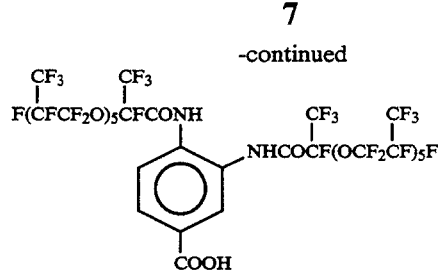
Compound 7
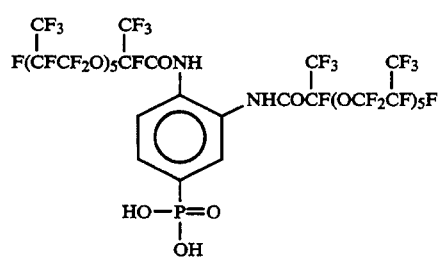
Compound 8
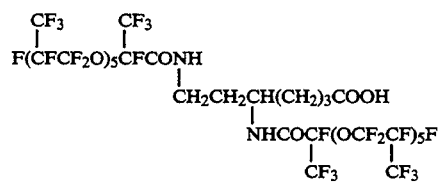
Compound 9
Compound 10
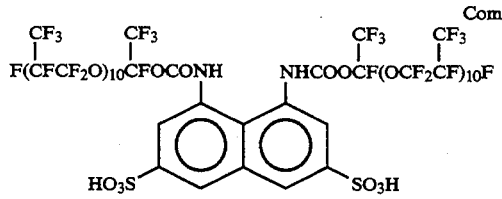
Compound 11
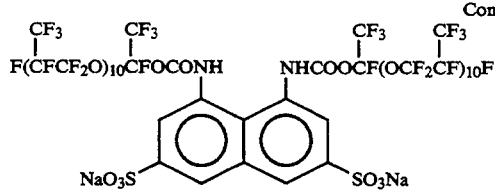
Compound 12
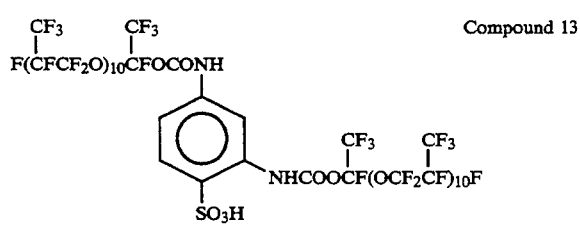
Compound 13
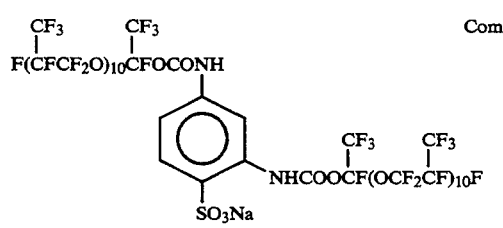
Compound 14
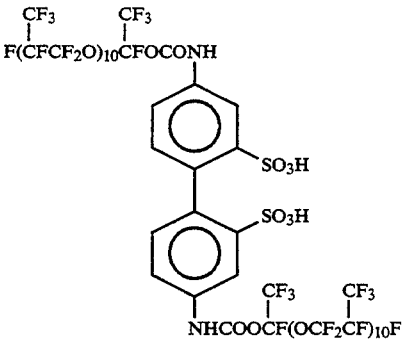
Compound 15
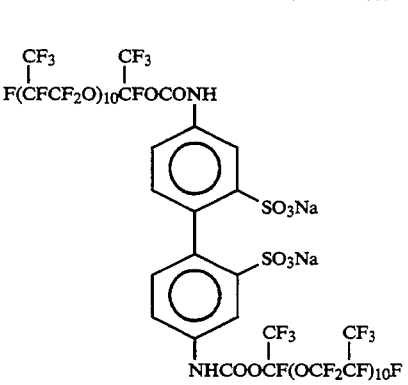
Compound 16
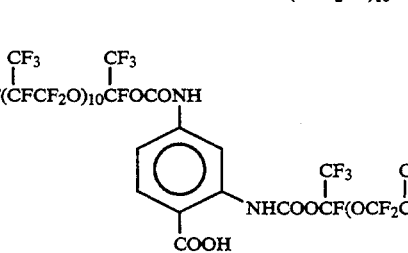
Compound 17
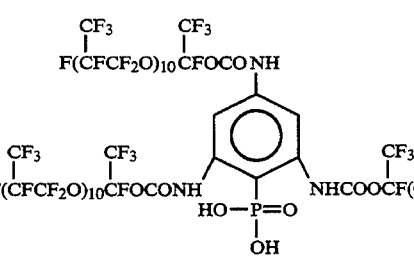
Compound 18
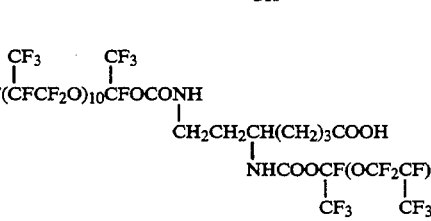
Compound 19
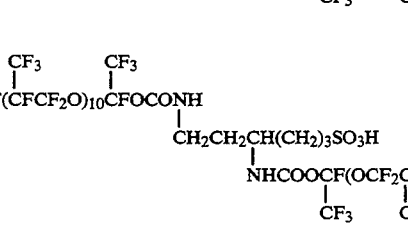
Compound 20

-continued
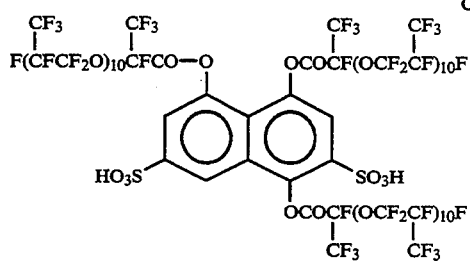
Compound 21
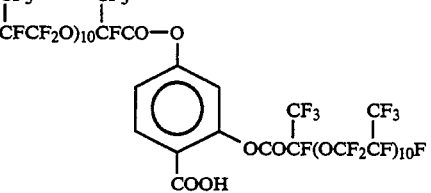
Compound 27
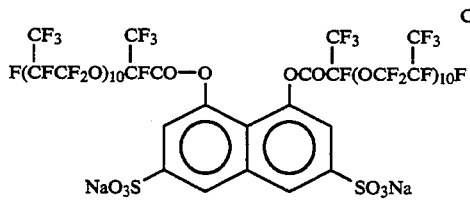
Compound 22
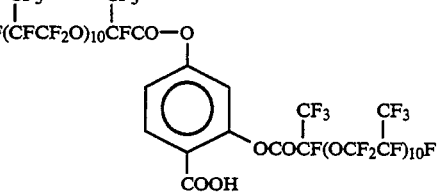
Compound 28
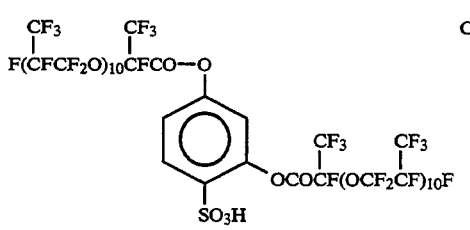
Compound 23
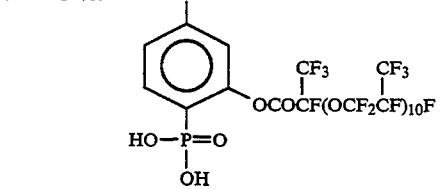
Compound 29
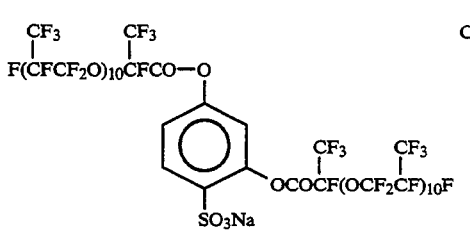
Compound 24
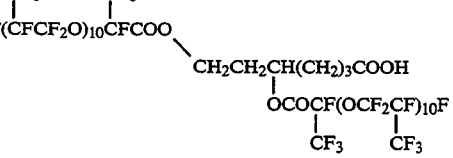
Compound 30
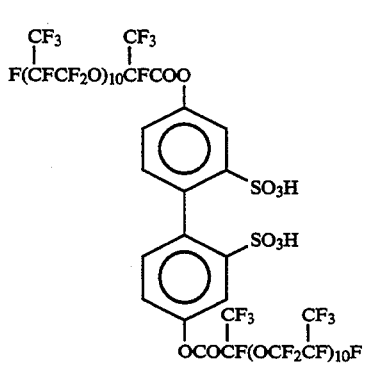
Compound 25
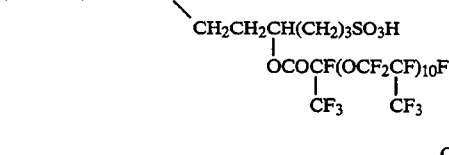
Compound 31
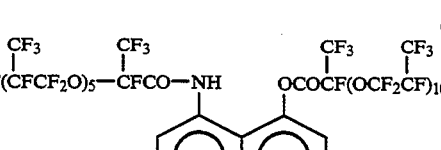
Compound 32
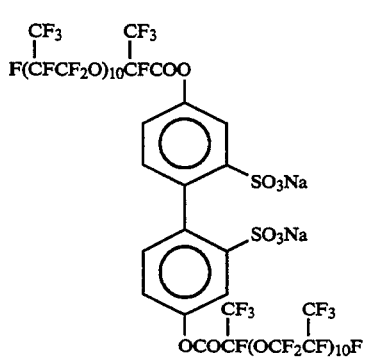
Compound 26
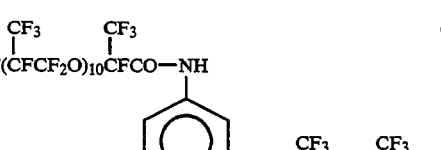
Compound 33
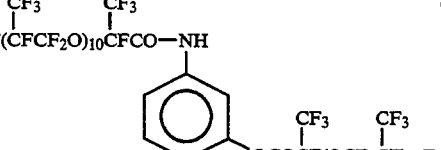
Compound 34

Compound 35
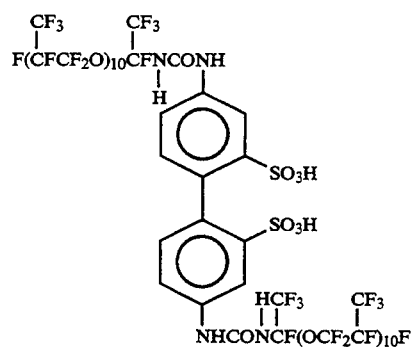
Compound 36
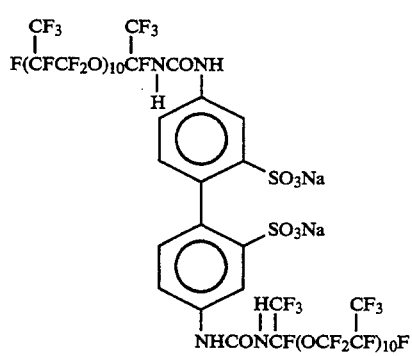
Compound 37
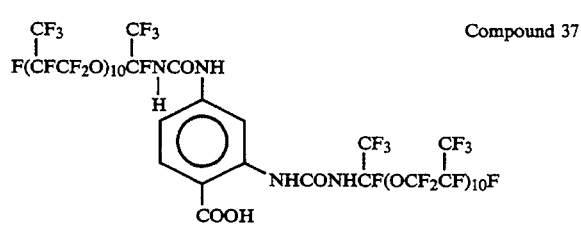
Compound 38
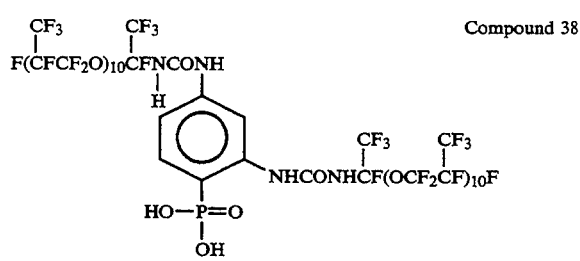
Compound 39
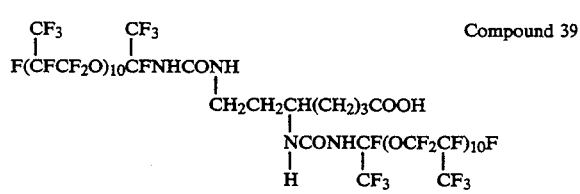
Compound 40
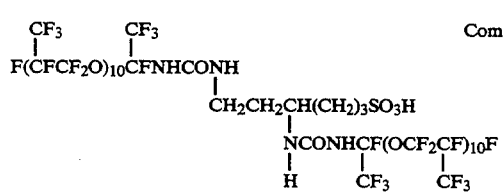
Compound 41
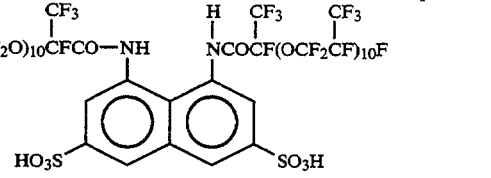
Compound 42
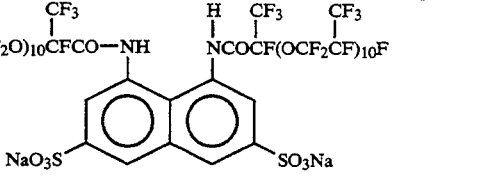
Compound 43
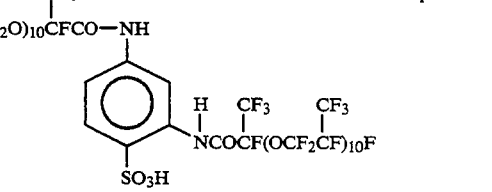
Compound 44
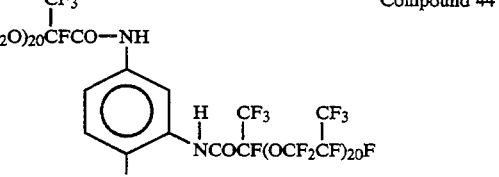
Compound 45
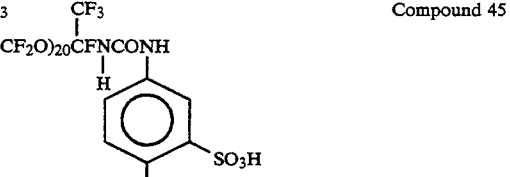
Compound 46
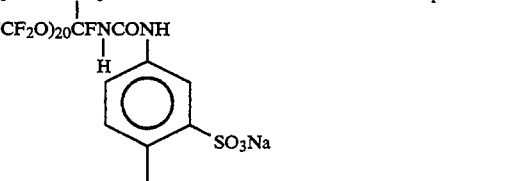

-continued

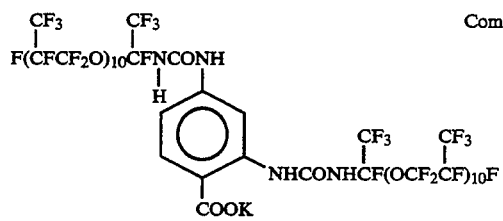
Compound 47

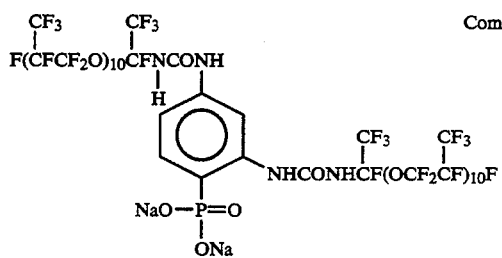
Compound 48

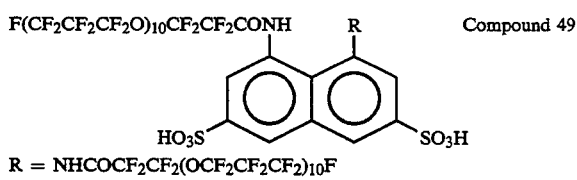
Compound 49
R = NHCOCF$_2$CF$_2$(OCF$_2$CF$_2$CF$_2$)$_{10}$F

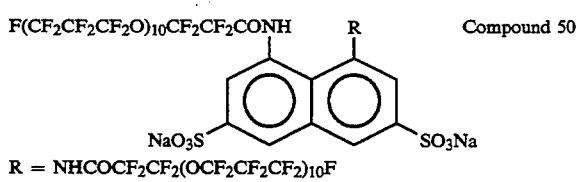
Compound 50
R = NHCOCF$_2$CF$_2$(OCF$_2$CF$_2$CF$_2$)$_{10}$F

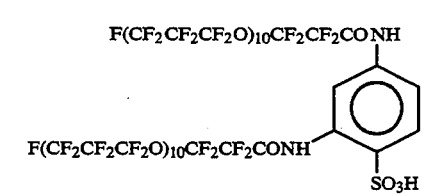
Compound 51

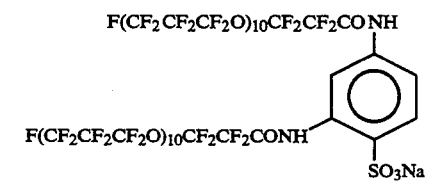
Compound 52

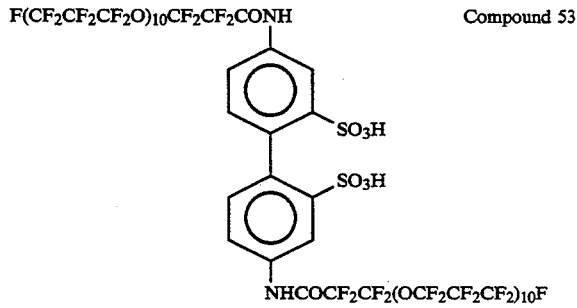
Compound 53

-continued

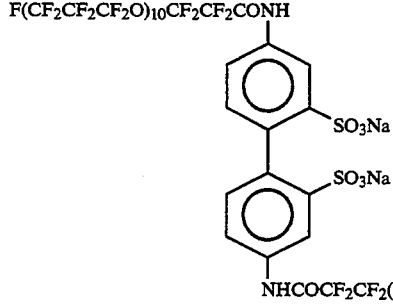
Compound 54

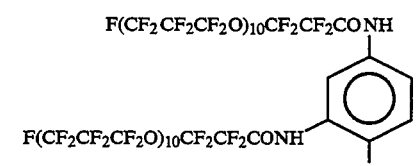
Compound 55

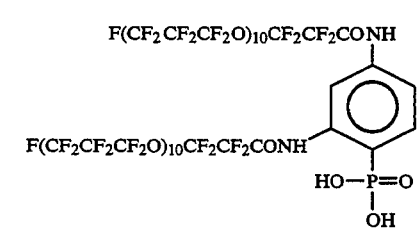
Compound 56

The magnetic recording medium of the present invention is produced by forming a layer containing the compound of the present invention as a protective or lubricating layer on the surface of a thin ferromagnetic metal film formed on a non-magnetic support by methods such as vacuum deposition. Methods for forming the surface protective layers or the lubricating layers include the following:

(1) a method of dissolving the compound of the present invention in an organic solvent and coating or spraying the resulting solution on the thin ferromagnetic metal film, followed by drying;

(2) a method of rubbing a substrate with a material impregnated with the compound of the present invention, thereby applying the compound of the present invention;

(3) a method of impregnating the non-magnetic support with a solution in which the compound of the present invention is dissolved in an organic solvent to allow the compound of the present invention to be adsorbed by a substrate; and (4) a method of forming a monomolecular film of the compound of the present invention on the surface of the non-magnetic support by Langmuir-Blodgett's method and the like In the case of the method (1) described above, the concentration of the compound of the present invention in the dissolving solution is preferably from 0.02 to 5 wt %.

As the organic solvents, fluorine-containing compounds are preferred. For example, organic solvents containing a chlorine or fluorine atom in the molecule (e.g., Freon 113, hydrogen-containing chlorofluorocarbon 225, Freon 112), fluorosolvents (e.g., FOMBLIN ZS-90, FOMBLIN ZS-100, and FOMBLIN ZS-200, manufactured by Montefluos Co., Ltd., fluorine series inactive solvents made by Minnesota Mining & Manufacturing, Co., Ltd. (e.g., FLUORINERT FC-72, FC- 84, FC-77, FC-75, FC-40, FC-43, FC-70, FC-71), and triperfluoroalkylamine can be used.

According to the case of method (2) described above, a small amount of the fluorine-containing multi-chain compound of the present invention can be moved to a ferromagnetic metal thin film surface by, for example, impregnating the compound of the present invention with a porous carrier such as non-woven fabric and rubbing the carrier on the ferromagnetic metal thin film surface.

The above-described compound of the present invention is applied preferably in an amount of 3 to 25 mg/m², and more desirably in an amount of 4.5 to 15 mg/m², of the surface of the metal film.

If the amount of the compound of the present invention applied is lower than the above range, durability tends to become insufficient. If it exceeds the above range, the coefficient of friction tends to increase.

The lubricating effect of the compound of the present invention in the magnetic recording medium of the present invention appears more strongly when the thin ferromagnetic metal film contains 20 to 40 atom % of oxygen in at least the surface portion (i.e., the region from the surface to a depth of 100 Å) thereof.

This is believed to be true because of the very strong binding of the above-described compound of the present invention to the thin oxidized metal film.

Accordingly, in the magnetic recording media of the present invention, the compounds of the present invention are seldom separated from the surfaces of the thin ferromagnetic metal films. For this reason, the durability to members such as magnetic heads and guide poles under the severe conditions of high or low humidity, particularly the still durability, is remarkably improved, and the coefficient of friction to running system members is reduced (in static, low speed and high speed modes, respectively). In particular, the coefficient of static friction is reduced to such a degree unattainable by conventional methods.

Synthesis Example of Compound of the Present Invention

In 300 g of Compound (E), 0.2 mol (364 g) of Compound (B) was dissolved. A total amount of 0.201 mol (41.5 g) of Compound (C) dissolved in 150 ml of perfluoromethylhexane was gradually added dropwise to the resulting solution for 15 minutes with stirring by a separatory funnel.

To this stirred solution, a solution prepared by adding 0.1 mol (34.4 g) of Compound (A) to a mixed solution of 40 ml of Compound (D) and 160 ml of Compound (E) was added dropwise by a separatory funnel to permit a chemical reaction to occur.

After the reaction, the reaction product was filtered (a 0.2-μm membrane filter was used), further washed with methyl alcohol and THF, and purified to obtain Compound (F), i.e., Compound 15 of the present invention.

(Compound)

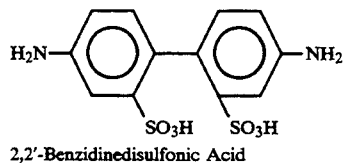

2,2'-Benzidinedisulfonic Acid (A)

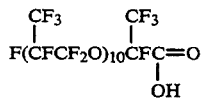

Perfluoropropylene Oxide Having Carboxylate Terminus (B)

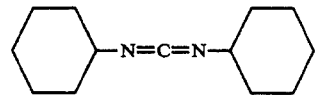

N,N'-Methanetetralylbiscyclohexaneamine (C)

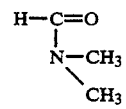

N,N'-Dimethylformamide (D)

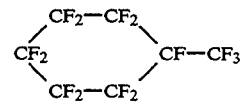

Perfluoromethylcyclohexane (E)

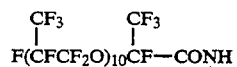

(F)

Compound 15 of the Present Invention

As the compounds of the present invention used in the magnetic recording media of the present invention, any may be used as long as they satisfy general formula (I). In particular, compounds having a molecular weight of 1,500 to 10,000 are preferable. More preferably, compounds having a molecular weight of 1,000 to 4,000 and a viscosity of 100 to 1,000 CST (at 40° C.) are excellent in running properties and provide durability.

If the viscosity of the compounds of the present invention is lower than the above-described range, the covering rate of the R groups having the fluoropolyether chains on the surface of the magnetic layer tends to reduced. Consequently, a decrease in the coefficient of friction can not be expected.

In the present invention, the protective or lubricating layer formed on the thin ferromagnetic metal film may include at least one conventional lubricating agent, in addition to one or more compounds of the present invention.

The lubricating agents which can be additionally included in the protective or lubricating layers include fatty acids, metal soaps, fatty acid amides, fatty acid esters, higher aliphatic alcohols, monoalkyl phosphates, dialkyl phosphates, trialkyl phosphates, paraffins, silicone oils, animal and vegetable oils, mineral oils, higher aliphatic amines, fine powders of inorganic compounds such as graphite, silica, molybdenum disulfide and tungsten disulfide, fine powders of resins such as polyethylene, polypropylene, polyvinyl chloride, ethylene-vinyl chloride copolymers and polytetrafluoroethylene, α-olefin polymers and unsaturated aliphatic hydrocarbons which are liquid at room temperature.

In the present invention, the surface of the vacuum-deposited thin film may also be modified by glow or plasma methods to improve the adhesion of the protective or lubricating layer with the thin ferromagnetic metal film.

In the magnetic recording medium of the present invention, the protective or lubricating layer composed of the compound of the present invention may comprise either a single layer or a plurality of layers.

Materials of the thin ferromagnetic metal films, the magnetic layers of the magnetic recording media of the present invention, include Fe, Co, Ni and other ferromagnetic metals, and further include ferromagnetic alloys such as Fe-Co, Fe-Ni, Co-Ni, Fe-Rh, Co-P, Co-B, Co-Y, Co-La, Co-Ce, Co-Pt, Co-Sm, Co-Mn, Co-Cr, Fe-Co-Ni, Co-Ni-P, Co-Ni-B, Co-Ni-Ag, Co-Ni-Nd, Co-Ni-Ce, Co-Ni-Zn, Co-Ni-Cu, Co-NI-W and Co-Ni-Re. These materials are made into films by vacuum deposition methods. The thickness thereof is in the range of 0.02 to 2 μm, and preferably in the range of 0.05 to 1.0 μm.

In addition, the above-described thin ferromagnetic metal film may also contain O, N, Cr, Ga, As, Sr, Zr, Nb, Mo, Rh, Pd, Sn, Sb, Te, Pm, Re, Os, Ir, Au, Hg, Pb, Bi and the like. In particular, it is desirable that the magnetic recording medium of the present invention contains oxygen derived by the oxidation of the thin ferromagnetic metal film. When oxygen or nitrogen is to be contained in the metal film, oxygen gas or nitrogen gas is generally introduced during vapor deposition of the metal. In particular, it is important to introduce oxygen gas during vapor deposition to allow the vicinity (a depth of 100 Å) near the surface to contain at least 20 atom % of oxygen. It is not easy to introduce oxygen by oxidation treatment after formation of the vapor-deposited film.

There is no particular limitation on the surface configuration of the magnetic layer. However, when the surface has projections having a height of 10 to 1,000 Å, the running properties and durability are particularly excellent.

The non-magnetic support used in the magnetic recording medium of the present invention preferably has a thickness of 4 to 50 μm.

Further, a substrate layer may be formed on the support to improve the adhesion of the thin ferromagnetic metal film and magnetic characteristics. Examples of such substrate layers include filler-containing resin layers in which fine particles of $SiO_2$ or $CaCO_3$ are homogeneously dispersed.

The supports used in the present invention include plastic bases such as polyethylene terephthalate, polyimides, polyamides, polyvinyl chloride, cellulose triacetate, polycarbonates, polyethylene naphthalate and polyphenylene sulfide. Al, Ti and stainless steel can also be employed.

The preparation of fine projections on the surface of the support before formation of the thin ferromagnetic film to improve the running durability results in appropriate unevenness on the surface of the support, which improves adhesion. The density of the fine projections on the surface of the support is $2 \times 10^6$ to $2 \times 10^8$ projections/$mm^2$, and the height of the projections is preferably 1 to 50 mm.

The magnetic recording media of the present invention may be used in any form such as a tape, a sheet, card and disk forms, but the tape form and the disk form are particularly preferable.

EXAMPLES

The present invention will be described in detail with reference to the following Examples that do not limit the scope of the invention.

EXAMPLES 1 TO 7 AND COMPARATIVE EXAMPLES 1 TO 3

A Co-Ni magnetic film (having a thickness of 150 nm) was formed on the surface of a polyethylene terephthalate film having a thickness of 13 μm by oblique incidence vapor deposition to prepare an original film of a magnetic recording medium. An electron beam evaporation source was used as an evaporation source. A Co-Ni alloy (Co: 80% by weight and Ni: 20% by weight) was charged therein, and oblique incidence vapor deposition was conducted at a degree of vacuum of $5 \times 10^{-5}$ Torr at an angle of incidence of 50 degrees.

Various lubricating agents described in Table 1 were each dissolved in solvent Flon 113 and coated on a thin ferromagnetic metal film of the resulting original film of the magnetic recording medium so as to give the amounts of the lubricating agents coated after drying described in Table 1. After drying, the resulting structure was slit to a width of 8 mm to prepare Sample Nos. 1 to 10.

TABLE 1

| Sample No. | Lubricating Agent | Coated Amount (mg/m²) | Remarks |
|---|---|---|---|
| 1 | Compound 1 of This Invention | 10 | Example 1 |
| 2 | Compound 12 of This Invention | 10 | Example 2 |
| 3 | Compound 13 of This Invention | 10 | Example 3 |
| 4 | Compound 19 of This Invention | 10 | Example 4 |
| 5 | Compound 21 of This Invention | 15 | Example 5 |
| 6 | Compound 32 of This Invention | 5 | Example 6 |
| 7 | Compound 35 of This Invention | 10 | Example 7 |
| 8 | The Following Compound A | 10 | Comparative Example 1 |
| 9 | The Following Compound B | 10 | Comparative Example 2 |
| 10 | The Following Compound C | 10 | Comparative Example 3 |

Compound A

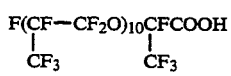

Compound B

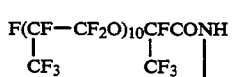

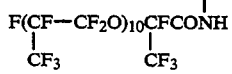

Compound C

TABLE 1-continued

| Sample No. | Lubricating Agent | Coated Amount (mg/m²) | Remarks |
|---|---|---|---|
| | HOOCCF₂(OC₂F₄)₁₀(OCF₂)₁₀CF₂COOH | | |

For the resulting magnetic tape Sample Nos. 1 to 10, the coefficients of static friction and dynamic friction (namely $\mu$ values) to a stainless bar under two kinds of environmental conditions (Condition A: 25° C., a relative humidity of 70%, and Condition B: 25° C., a relative humidity of 15%), and the still durability on a 8-mm type VTR, were examined by the following methods. The results are shown in Table 2.

Measurement of the Coefficients of Friction

For the coefficient of static friction ($\mu_0$), the surface of the magnetic layer of the magnetic tape sample was brought into contact with a stainless pole at a tension ($T_1$) of 50 g at a contact angle of 180°, and the tension ($T_2$) was measured immediately before the magnetic tape began to move when the force applied to the magnetic tape was increased at a rate of 0.01 N/second. For the coefficient of dynamic friction ($\mu_1$), the tension ($T_2$) required to run the tape at the same tension ($T_1$) as above at a constant speed of 10 mm/second was measured. Both coefficients of friction ($\mu$) was calculated for each measured value, based on the following equation:

$$\mu_0, \mu_1 = \frac{1}{\pi} \ln(T_2/T_1)$$

Measurement of Still Durability

Using a 8-mm type VTR (FUJIX-8 M6 type, manufactured by Fuji Photo Film Co., Ltd., provided that the function for restricting the still reproducing time was removed), a pause button was pushed in reproducing images and the time until images were no longer produced was measured, thereby evaluating the still durability.

TABLE 2

| Sample No. | Condition A $\mu_0$ | Condition A $\mu_1$ | Condition B $\mu_0$ | Condition B $\mu_1$ | Still Durability Condition A | Still Durability Condition B |
|---|---|---|---|---|---|---|
| 1 | 0.26 | 0.16 | 0.25 | 0.16 | 60 or more | 60 or more |
| 2 | 0.31 | 0.18 | 0.29 | 0.19 | 60 or more | 60 or more |
| 3 | 0.28 | 0.20 | 0.26 | 0.20 | 60 or more | 60 or more |
| 4 | 0.30 | 0.20 | 0.29 | 0.20 | 60 or more | 60 or more |
| 5 | 0.29 | 0.20 | 0.29 | 0.20 | 60 or more | 60 or more |
| 6 | 0.25 | 0.17 | 0.24 | 0.17 | 60 or more | 54 |
| 7 | 0.30 | 0.20 | 0.29 | 0.20 | 60 or more | 60 or more |
| 8 | 0.70 | 0.40 | 0.55 | 0.32 | 15 | 15 |
| 9 | 0.60 | 0.29 | 0.50 | 0.25 | 40 | 10 |
| 10 | 0.60 | 0.30 | 0.50 | 0.30 | 25 | 5 |

The thin metal type magnetic recording medium of the present invention in which the surface of the magnetic layer is provided with a layer containing a compound of the present invention is excellent in static and dynamic friction and still durability. Further, the good characteristics thereof are realized over a wide range of the conditions from high humidity to low humidity.

In the magnetic recording media of the present invention, the compounds of the present invention high in anchor effect and lubricating effect to the thin ferromagnetic metal films are used as the lubricating agents applied to the surfaces of the magnetic layers. Consequently, the magnetic recording media can always have stable running properties and durability even under the severe environmental conditions of low or high humidity.

While the invention has been described in detail and with reference o specific embodiments thereof, it will be apparent to one skilled in the art that various changes and modifications can be made therein without departing from the spirit and scope thereof.

What is claimed is:

1. A magnetic recording medium comprising a non-magnetic support and a magnetic layer of a Co or Co-Ni alloy ferromagnetic metal thin film formed thereon, wherein said ferromagnetic metal thin film (1) contains 20 to 40 atom % of oxygen in a region from the surface of said ferromagnetic metal thin film to a depth of 100 Å; and (2) has formed thereon at least one fluorine-containing multi-chain compound represented by the following general formula (I):

$$(P)_m Q(R)_n \qquad (I)$$

wherein Q represents a (m+n) valent organic group selected from the group consisting of (CH₂)₂CH(CH₂)₃,

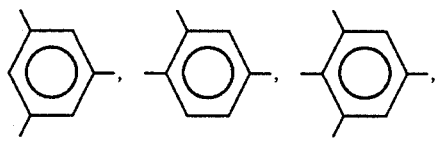

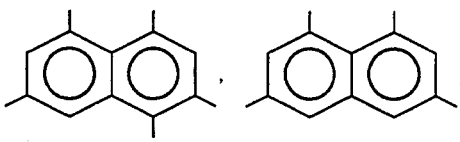

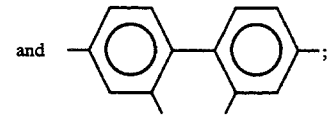

and

R represents a monovalent group comprising a fluoropolyether chain which is amide bonded or ester bonded to Q;

P represents a monovalent oxo-acid derivative group or a monovalent group which is a salt of an oxo-acid derivative selected from the group consisting of a sulfonic acid group, a sulfinic acid group, a carboxyl group, a phosphoric acid group, a phosphonic acid group, and salts thereof;

m represents an integer of 1 or more;

n represents an integer of 2 or more; and, wherein said at least one fluorine-containing multi-chain compound represented by general formula (I) is coated in an amount of from 3 to 25 mg/m² on the surface of said ferromagnetic metal thin film.

2. The magnetic recording medium of claim 1, wherein R has a terminus which is chemically bonded to Q and which is an amide bond group.

3. The magnetic recording medium of claim 1, wherein said ferromagnetic metal thin film is oxidized on the surface thereof, and the fluorine-containing multi-chain compound represented by general formula (I) has a molecular weight of 1,500 to 10,000.

4. The magnetic recording medium of claim 1 wherein m is 1, 2 or 3.

5. The magnetic recording medium of claim 1, wherein the fluoropolyether chain includes a fluoropolyether site selected from the group consisting of $[OCF_2CF(CF_3)]_k$, $(OCF_2CF_2CF_2)_l$, and $(OCF_2)_p(OCF_2CF_2)_q$, wherein k is an integer from 3 to 40, l is an integer from 3 to 50, p is an integer from 2 to 20, and q equals p.

6. The magnetic recording medium of claim 1, wherein the compound of general formula (I) has a molecular weight from 1,000 to 4,000 and viscosity at 40° C. of 100 to 1,000 CST.

7. The magnetic recording medium of claim 1, wherein the non-magnetic support has a thickness from 4 to 50 μm.

* * * * *